United States Patent
Walchuk et al.

(10) Patent No.: US 7,507,781 B2
(45) Date of Patent: Mar. 24, 2009

(54) ANIONIC COPOLYMERS PREPARED IN AN INVERSE EMULSION MATRIX

(75) Inventors: Brian Walchuk, Hockessin, DE (US); Fushan Zhang, Jacksonville, FL (US); John C. Harrington, Jacksonville, FL (US); William Sean Carey, Wallingford, PA (US); Richard Lee Brady, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 98 days.

(21) Appl. No.: 11/880,544

(22) Filed: Jul. 23, 2007

(65) Prior Publication Data

US 2007/0265358 A1 Nov. 15, 2007

Related U.S. Application Data

(62) Division of application No. 10/313,632, filed on Dec. 6, 2002, now Pat. No. 7,250,448.

(51) Int. Cl.
*B01F 3/08* (2006.01)

(52) U.S. Cl. .............................. 526/81; 516/20; 516/22; 524/522; 524/801; 526/217; 526/916

(58) Field of Classification Search ................... 516/81, 516/20, 22; 524/522, 801; 526/217, 916
See application file for complete search history.

(56) References Cited

U.S. PATENT DOCUMENTS

| | | | | |
|---|---|---|---|---|
| 6,331,229 B1 | * | 12/2001 | Wong Shing et al. | 162/168.3 |
| 2002/0190005 A1 | * | 12/2002 | Branning | 210/702 |

* cited by examiner

*Primary Examiner*—Kelechi C Egwim
(74) *Attorney, Agent, or Firm*—Joanne Mary Fobarc Rossi

(57) ABSTRACT

A papermaking method and a composition which utilize, as a drainage aid, a water-soluble anionic copolymer prepared via a water-in-oil polymerization technique that, absent a crosslinking agent, is characterized by a Huggins' constant (k') determined in 0.01M NaCl greater than 0.75 and a storage modulus (G') for a 1.5 wt. % actives polymer solution at 4.6 Hz greater than 175 Pa.

15 Claims, No Drawings

ANIONIC COPOLYMERS PREPARED IN AN INVERSE EMULSION MATRIX

CROSS REFERENCE TO RELATED APPLICATIONS

This application is a divisional of and claims priority from U.S patent application Ser. No. 10/313,632, filed Dec. 6, 2002 now U.S. Pat. No. 7,250,448, which claimed priority from U.S. patent application Ser. No. 10/006,029, filed Dec. 7, 2001, the foregoing applications are herein incorporated by reference.

FIELD OF THE INVENTION

The present invention relates to water-soluble anionic copolymers obtained by inverse emulsion polymerization and their use in the preparation of cellulosic fiber compositions. The present invention further relates to cellulosic fiber compositions, such as paper and paperboard, which incorporate the water-soluble anionic copolymers.

BACKGROUND OF THE INVENTION

The making of cellulosic fiber sheets, particularly paper and paperboard, includes the following: 1) producing an aqueous slurry of cellulosic fiber; which may also contain inorganic mineral extenders or pigments; 2) depositing this slurry on a moving papermaking wire or fabric; and 3) forming a sheet from the solid components of the slurry by draining the water.

The foregoing is followed by pressing and drying the sheet to further remove water. Organic and inorganic chemicals are often added to the slurry prior to the sheet-forming step to make the papermaking method less costly, more rapid, and/or to attain specific properties in the final paper product.

The paper industry continuously strives to improve paper quality, increase productivity, and reduce manufacturing costs. Chemicals are often added to the fibrous slurry before it reaches the papermaking wire or fabric, to improve the method drainage/dewatering and solids retention; these chemicals are called retention and/or drainage aids.

As to drainage/dewatering improvement, drainage or dewatering of the fibrous slurry on the papermaking wire or fabric is often the limiting step in achieving faster method speeds. Improved dewatering can also result in a drier sheet in the press and dryer sections, resulting in reduced steam consumption. In addition, this is the stage in the papermaking method that determines many sheet final properties.

With respect to solids retention, papermaking retention aids are used to increase the retention of fine furnish solids in the web during the turbulent method of draining and forming the paper web. Without adequate retention of the fine solids, they are either lost to the mill effluent or accumulate to high levels in the recirculating white water loop, potentially causing deposit buildup. Additionally, insufficient retention increases the papermakers' cost due to loss of additives intended to be adsorbed on the fiber to provide the respective paper opacity, strength, or sizing properties.

High molecular weight (MW) water-soluble polymers with either cationic or anionic charge have traditionally been used as retention and drainage aids. Recent development of inorganic microparticles, known as retention and drainage aids, in combination with high MW water-soluble polymers, have shown superior retention and drainage efficacy compared to conventional high MW water-soluble polymers. U.S. Pat. Nos. 4,294,885 and 4,388,150 teach the use of starch polymers with colloidal silica. U.S. Pat. No. 4,753,710 teaches flocculating the pulp furnish with a high MW cationic flocculant, inducing shear to the flocculated furnish, and then introducing bentonite clay to the furnish. U.S. Pat. Nos. 5,274,055 and 5,167,766 disclose using chemically cross-linked organic microparticles or micropolymers as retention and drainage aids in the papermaking process.

Copolymers are also used to control deposition of contaminants or organic deposits in papermaking systems. Organic deposits is a term used to described tacky, water insoluble materials in the papermaking system that are detrimental to the production of paper. Such materials derived from trees during the pulping and papermaking process are termed pitch or wood pitch, while the term stickies is used to describe contaminants that are derived from adhesives introduced into the papermaking process as a contaminant of recycled fiber. One strategy for eliminating these materials is to agglomerate the organic deposits into larger, non-tacky particles that can be removed from the papermaking stock or incorporated into the sheet without causing deposits in the papermaking system of defects in the sheet. Chemicals that are able to interact with organic deposits and mitigate their negative impact include surfactants and polymers. The polymers can be ionic or non-ionic, and includes materials used as flocculants, coagulants and dispersants.

The efficacy of the polymers or copolymers used will vary depending upon the type of monomers from which they are composed, the arrangement of the monomers in the polymer matrix, the molecular weight of the synthesized molecule, and the method of preparation. It is the latter characteristic that is a focus of the present invention.

Specifically, it has been unexpectedly discovered that water-soluble anionic copolymers when prepared under certain conditions exhibit unique physical characteristics. Additionally, said copolymers provide unanticipated activity in certain applications including papermaking applications such as retention and drainage aids and contaminant control aids. Although the synthesis methods employed are generally known to those skilled in the art, there is no prior art suggesting that the unique physical characteristics and unanticipated activity observed would result.

SUMMARY OF THE INVENTION

The present invention is directed to water soluble anionic copolymers and cellulosic fiber compositions containing the copolymer, particularly a cellulosic sheet such as paper or paperboard. The invention is also directed to a method for making the copolymer and the cellulosic fiber compositions.

In another aspect, the present invention provides a method of making a cellulosic fiber composition comprising adding, to a cellulose pulp slurry, a water-soluble anionic copolymer of Formula I below. The invention further relates to cellulosic fiber compositions, including an aqueous slurry of cellulosic pulp, containing such water-soluble anionic copolymers. As used herein, the term copolymer is understood to be polymer compositions consisting of two or more different monomeric units.

In accordance with the present invention, it has been unexpectedly discovered that certain anionic copolymers exhibit unique physical characteristics and provide unanticipated activity when prepared employing certain polymerization conditions. The anionic copolymers of the invention are obtained from inverse (water-in-oil) emulsion polymerization of one or more water-soluble monomers, in particular one or more anionic monomers. The resulting anionic copolymers are water-soluble.

The anionic copolymers of the invention have the formula:

　　　　　　　　　　　　　　　(Formula I)

wherein B is a nonionic polymer segment formed from the polymerization of one or more nonionic monomers; F is an anionic polymer segment formed from polymerization of one or more ethylenically unsaturated anionic monomers; the molar % ratio B:F is from 5:95 to 95:5; and "co" is a designation for a polymer system with an unspecified arrangement of two or more monomer components. Furthermore, the preparation is conducted in a fashion, absent cross-linking agents and via a water-in-oil emulsion procedure, such that the Huggins' constant (k') determined in 0.01M NaCl is greater than 0.75 and the storage modulus (G') for a 1.5 wt. % actives polymer solution at 4.6 Hz is greater than 175 Pa.

DETAILED DESCRIPTION OF THE INVENTION

The present invention provides for water-soluble anionic copolymers with unique physical characteristics, methods of making the copolymers, and methods of making cellulose fiber compositions that comprise adding the water-soluble anionic copolymer to a cellulose pulp slurry. The general structure of the water-soluble anionic copolymer of the present invention is provided in Formula I.

　　　　　　　　　　　　　　　(Formula I)

The nonionic polymer segment B in Formula I is the repeat unit formed after polymerization of one or more nonionic monomers. Exemplary monomers encompassed by B include, but are not limited to, acrylamide; methacrylamide; N-alkylacrylamides, such as N-methylacrylamide; N,N-dialkylacrylamide, such as N,N-dimethylacrylamide; methyl acrylate; methy methacrylate; acrylonitrile; N-vinyl methylacetamide; N-vinyl methyl formamide; vinyl acetate; N-vinyl pyrrolidone, alkyl acrylates, alkyl methacrylates, alkyl acryamides, alkyl methacrylamides, and alkyloxylated acrylates and methacrylates such as alkyl polyethyleneglycol acrylates, alkyl polyethyleneglycol methacrylates mixtures of any of the foregoing and the like.

The anionic polymer segment F in Formula I is the repeat unit formed after polymerization of one or more anionic monomers. Exemplary monomers encompassed by F include, but are not limited to, the free acids and salts of acrylic acid; methacrylic acid; maleic acid; itaconic acid; acrylamidoglycolic acid; 2-acrylamido-2-methyl-1-propanesulfonic acid; 3-allyloxy-2-hydroxy-1-propanesulfonic acid; styrenesulfonic acid; vinylsulfonic acid; vinylphosphonic acid; 2-acrylamido-2-methylpropane phosphonic acid; mixtures of any of the foregoing and the like.

The molar percentage of B:F of nonionic monomer to anionic monomer may fall within the range of 95:5 to 5:95, preferably the range is from about 75:25 to about 25:75 and even more preferably the range is from about 65:35 to about 35:65 and most preferably from about 60:40 to about 40:60. In this regard, the molar percentages of B and F must add up to 100%. It is to be understood that more than one kind of nonionic monomer may be present in the Formula I. It is also to be understood that more than one kind of anionic monomer may be present in the Formula I.

In one preferred embodiment of the invention the water-soluble anionic copolymer is defined by Formula I where B, the nonionic polymer segment, is the repeat unit formed after polymerization of acrylamide; and F, the anionic polymer segment, is the repeat unit formed after polymerization of a salt of acrylic acid. This preferred embodiment can be represented by the following formula:

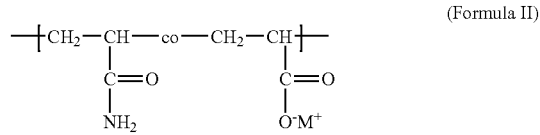　　　　　　　　　　　　　　　(Formula II)

wherein $M^+$ is the cation of the salt of the acrylic acid and is preferably $Na^+$, $K^+$ or $NH_4^+$; and the molar % ratio of B:F is from about 75:25 to about 25:75.

In another particularly preferred embodiment of the invention, in Formula II, M is $Na^+$ and the molar % ratio of the anionic segment to nonionic segment is from 60:40 to 40:60.

It is also an aspect of this invention that the water-soluble anionic copolymers are prepared in such a fashion that the resulting polymers exhibit unique physical characteristics and provide unanticipated activity. The resulting water-soluble anionic copolymer is not considered to be a cross-linked polymer in that no cross-linking agent is utilized in the preparation. It is thought that small amounts of cross linking agent should not significantly affect the polymer properties of the present invention. The physical characteristics of the water-soluble anionic copolymers are unique in that their Huggins' constant (k') as determined in 0.01M NaCl is greater than 0.75 and the storage modulus (G') for a 1.5 wt. % actives polymer solution at 4.6 Hz is greater than 175 Pa, preferably greater than 190 and even more preferably greater than 205. The Huggins' constant is greater than 0.75, preferably greater than 0.9 and even more preferably greater than 1.0

Preferably the water-soluble anionic copolymers of the present invention are prepared by an inverse (water-in-oil) emulsion polymerization technique. Such processes are known to those skilled in the art, for example see U.S. Pat. No. 3,284,393, and Reissue U.S. Pat. Nos. 28,474 and 28,576, herein incorporated by reference. Preparation of an aqueous solution from the emulsion polymer may be effected by inversion by adding the emulsion polymer to water, wherein the emulsion or water may also contain a breaker surfactant. Breaker surfactants are additional surfactants that are added to an emulsion to promote inversion. The resulting copolymers may also be further isolated by precipitating in an organic solvent such as acetone and dried to a powder form. The powder can be easily dissolved in an aqueous medium for use in desired applications.

In general, an inverse emulsion polymerization process is conducted by 1) preparing an aqueous solution of the monomers, 2) adding the aqueous solution to a hydrocarbon liquid containing appropriate surfactant or surfactant mixture to form an inverse monomer emulsion, 3) subjecting the monomer emulsion to free radical polymerization, and 4) optionally adding a breaker surfactant to enhance the inversion of the emulsion when added to water.

Polymerization of the emulsion may be carried out in any manner known to those skilled in the art. Initiation may be effected with a variety of thermal and redox free-radical initiators including azo compounds such as azobisisobutyronitrile and the like. Polymerization may also be effected by photochemical irradiation processes, irradiation or by ionizing radiation with a $^{60}Co$ source.

Preferred initiators are oil soluble thermal initiators. Typical examples include, but are not limited to, 2,2'-azobis-(2,4-dimethylpentanonitrile); 2,2'-azobisisobutyronitrile (AIBN);

2,2'-azobis-(2,-methylbutanonitrile); 1,1'-azobis-(cyclohexanecarbonitrile); benzoylperoxide and lauryl peroxide Any of the chain transfer agents known to those skilled in the art may be used to control the molecular weight. Those include, but are not limited to, lower alkyl alcohols such as isopropanol, amines, mercaptans such as mercaptoethanol, phosphites, thioacids, allyl alcohol, and the like.

The aqueous solution typically comprises an aqueous mixture of nonionic monomer or mixtures of nonionic monomers, and an anionic monomer or mixtures of anionic monomers. The aqueous phase may also comprise such conventional additives as are desired. For example, the mixture may contain chelating agents, pH adjusters, initiators, chain transfer agents as described above, and other conventional additives. For the preparation of the water-soluble anionic copolymer materials the pH of the aqueous solution is below 7 and is preferably equal to or greater than 2, more preferably the pH is about 4 to about 6.

The hydrocarbon liquid typically comprises straight-chain hydrocarbons, branched-chain hydrocarbons, saturated cyclic hydrocarbons, aromatic hydrocarbons, or mixtures thereof.

The surfactants or surfactant mixtures used in the invention are generally oil soluble. One or more surfactant can be used. The surfactant or surfactant mixture chosen for the invention includes at least one diblock or triblock surfactant. The choice and amount of the surfactant or surfactant mixtures are selected in order to yield an inverse monomer emulsion for polymerization. Such surfactants are known to those skilled in the art, for example see "Hypermer Polymeric Surfactants: Emulsifiers for Inverse Polymerization Processes", ICI Surfactants product literature, ICI Americas Inc., 1997. Exemplary surfactants include, but are not limited to, sorbitan monooleate (e.g., Atlas G-946, Uniqema, New Castle, Del.), sorbitan sequioleate, sorbitan trioleate, polyoxyethylene sorbitan monooleate, di-2-ethylhexylsulfosuccinate, oleamidopropyldimethylamine, sodium isostearyl-2-lactate. Diblock and triblock polymeric surfactants are used in the present invention. Exemplary diblock and triblock polymeric surfactants include, but are not limited to diblock and triblock copolymers based on polyester derivatives of fatty acids and poly[ethyleneoxide] (e.g., Hypermer® B246SF and IL-2595, Uniqema), diblock and triblock copolymers based on poly[ethyleneoxide] and poly[propyleneoxide], diblock and triblock copolymers based on polyisobutylene succinic anhydride and poly[ethyleneoxide], mixtures of any of the foregoing and the like. Preferably the diblock and triblock copolymers are based on polyester derivatives of fatty acids and poly[ethyleneoxide]. When a triblock surfactant is used, it is preferable that the triblock contains two hydrophobic regions and one hydrophilic region i.e. hydrophobe-hydrophile-hydrophobe. Preferably, one or more surfactants are selected in order to obtain a HLB (Hydrophobic Lipophilic Balance) value ranging from about 2 to 8, preferably 3 to 7 and more preferably about 4 to 6.

The amount (based on weight percent) of diblock or triblock surfactant is dependent on the amount of monomer used. The ratio of diblock or triblock surfactant to monomer is at least about 3 to 100. The amount of diblock or triblock surfactant to monomer can be greater than 3 to 100 and preferably is at least about 4 to 100 and more preferably 5 to 100 and even more preferably about 6 to 100. The diblock or triblock surfactant is the primary surfactant of the emulsification system. A secondary surfactant can be added the ease handling and processing to improve emulsion stability or alter viscosity. Examples of secondary surfactants included but are not limited to sorbitan fatty acid esters, ethoxylated sorbitan fatty acid esters, polyethoxylated sorbitan fatty acid, the ethylene oxide and/or propylene oxide adducts of alkylphenols, the ethylene oxide and/or propylene oxide adducts of long chain alcohols or fatty acids, mixed ethylene oxide/propylene oxide block copolymers, alkanolamides, and the like.

Polymerization of the inverse emulsion may be carried out in any manner known to those skilled in the art, for example see Allcock and Lampe, *Contemporary Polymer Chemistry*, (Englewood Cliffs, N.J., PRENTICE-HALL, 1981), chapters 3-5.

The present invention provides for a cellulosic fiber composition comprising cellulosic fiber and the copolymer of the present invention.

The present invention also provides for a method of making the cellulosic fiber composition comprising the step of adding the copolymer of the present invention to a cellulosic slurry or cellulosic pulp slurry.

The copolymers of the invention can be used in papermaking systems and processes. The copolymers are useful as drainage and retention aids as well as contaminant control aids. In commercial papermaking a slurry of cellulosic fibers or pulp is deposited on a moving papermaking wire or fabric. The slurry may contain other chemicals, such as sizing agents, starches, deposit control agents, mineral extenders, pigments, fillers, organic or inorganic coagulants, conventional flocculants, or other common additives to paper pulp. As water from the deposited slurry is removed a sheet forms. Ordinarily the sheets are then pressed and dried to form paper or paper board. The copolymers of the invention are added to the slurry before it reaches the wire to improve the drainage or dewatering and the retention of the fiber fines and fillers in the slurry.

As a contaminant control aid the polymers of the present invention inhibit the deposition of pitch and stickies from the virgin or recycled pulp stock on the papermaking equipment. The aid is added to the pulp slurry where it interferes with the agglomeration of the pitch and stickies that would otherwise detrimentally affect the paper, paper making equipment or paper making processes.

Suitable cellulosic fiber pulps for the method of the invention include conventional papermaking stock such as traditional chemical pulp. For instance, bleached and unbleached sulfate pulp and sulfite pulp, mechanical pulp such as groundwood, thermomechanical pulp, chemi-thermomechanical pulp, recycled pulp such as old corrugated containers, newsprint, office waste, magazine paper and other non-deinked waste, deinked waste, and mixtures thereof, may be used.

The copolymer of the invention may be provided to the end use application in a number of physical forms. In addition to the original emulsion form, the inventive copolymer may also be provided as an aqueous solution, dry solid powder, or dispersion form. The inventive copolymer is typically diluted at the application site to produce an aqueous solution of 0.1 to 1% active polymer.

This dilute solution of the inventive copolymer is then added to the paper process to affect retention and drainage. The inventive copolymer may be added to the thick stock or thin stock, preferably the thin stock. The copolymer may be added at one feed point, or may be split fed such that the copolymer is fed simultaneously to two or more separate feed points. Typical stock addition points include feed point(s) before the fan pump, after the fan pump and before the pressure screen, or after the pressure screen.

The inventive copolymer is preferably employed in a proportion of from about 0.01 lb. to about 10 lbs. of active polymer per ton of cellulosic pulp, based on the dry weight of the pulp. The concentration of copolymer is more preferably from about 0.05 lb. to about 5 lbs. of active polymer per ton of dried cellulosic pulp.

The present invention will now be further described with reference to a number of specific examples that are to be regarded solely as illustrative and not restricting the scope of the present invention.

EXAMPLES

Water Soluble Anionic Copolymers and Comparative Copolymers

Example 1

Poly[acrylamide-co-ammonium acrylate] Inverse Emulsion

To a suitable reaction flask equipped with an overhead mechanical stirrer, thermometer, nitrogen sparge tube, and condenser was charged an oil phase of paraffin oil (135.0 g, Exxsol D80 oil, Exxon—Houston, Tex.) and surfactants (4.5 g Atlas G-946 and 9.0 g Hypermer® B246SF). The temperature of the oil phase was then adjusted to 37° C.

An aqueous phase was prepared separately which comprised 53-wt. % acrylamide solution in water (126.5 g), acrylic acid (68.7 g), deionized water (70.0 g), and Versenex 80 (Dow Chemical) chelant solution (0.7 g). The aqueous phase was then adjusted to pH 5.4 with the addition of ammonium hydroxide solution in water (33.1 g, 29.4-wt. % as $NH_3$). The temperature of the aqueous phase after neutralization was 39° C.

The aqueous phase was then charged to the oil phase while simultaneously mixing with a homogenizer to obtain a stable water-in-oil emulsion. This emulsion is then mixed with a 4-blade glass stirrer while being sparged with nitrogen for 60 minutes. During the nitrogen sparge the temperature of the emulsion was adjusted to 50±1° C. Afterwards, the sparge was discontinued and a nitrogen blanket implemented.

The polymerization was initiated by feeding a 3-wt. % AIBN solution in toluene (0.213 g) over a period of 2 hours. This corresponds to an initial AIBN charge as AIBN of 250 ppm on a total monomer basis. During the course of the feed the batch temperature was allowed to exotherm to 62° C. (~50 minutes), after which the batch was maintained at 62±1° C. After the feed the batch was held at 62±1° C. for 1 hour. Afterwards 3-wt. % AIBN solution in toluene (0.085 g) was then charged in under one minute. This corresponds to a second AIBN charge as AIBN of 100 ppm on a total monomer basis. Then the batch was held at 62±1° C. for 2 hours. Then batch was then cooled to room temperature and the product collected.

The preparation of copolymer Examples 2-13 and Comparative Examples 1-11 were conducted according to the method of Example 1, except for changes provided in Table 1 and the following text.

Examples 2-4

Examples 2-4 were prepared as described in Example 1 except the aqueous phases were adjusted to pH 3.0, 4.0, and 6.0, respectively.

Comparative Examples 1 and 2

Comparative Examples 1 and 2 were prepared as described in Example 1 except the aqueous phases were adjusted to pH 7.1, and 8.0; respectively. The storage modulus, G', of these two products was 115 and 36 Pa respectively. Both of these values are less than the 175 Pa threshold value for this invention.

Examples 5-6

Examples 5-6 were prepared as described in Example 1 except the weight ratio of the Atlas G-946 and Hypermer® B246SF surfactants was adjusted to 2:1 and 1:1, respectively.

Examples 7-9

Examples 7-9 were prepared as described in Example 1 except the surfactant system was varied as indicated in Table 1.

Comparative Example 3 and 4

It is noted that the surfactant systems utilized in Comparative Examples 3 and 4 are equivalent to those utilized in the preparation of the organic microbeads of U.S. Pat. Nos. 5,167,766 and 5,274,055. For Comparative Example 3, the Hydrophilic Lipophilic Balance of the surfactants used is greater than eight. For Comparative Example 4, it was necessary to adjust the aqueous phase to pH 7.0 to yield a stable emulsion. Apparently, the surfactant and/or initiator packages were not sufficient to produce the desired final product, with G'>175 Pa and k'>0.75.

Example 10

Example 10 was prepared as described in Example 1 except the initiator system was varied as indicated in Table 1. In this Example the initial oxidant (t-butylhydroperoxide) charge was fed in one portion while the initial reductant (sodium metabisulfite) charge was fed dropwise to the reactor. The time for the reductant addition was 3.5 hours.

Comparative Example 5 and 6

For Comparative Example 5 the initial oxidant (cumene hydroperoxide), 25 ppm mole/mole based on total monomers, was charged in less than 5 minutes and the reductant (sodium metabisulfite), 25 ppm mole/mole, based on total monomers, was charged over a 3 hour period, followed by a 45-minute hold. The second oxidant and reductant charges, both at 50 ppm mole/mole based on total monomer, where then fed in one portion, after which the batch was held at reaction temperature of ~50° C. for 2 hours.

For Comparative Example 6 the initial oxidant (potassium bromate) was rapidly charged followed by the charge of the reductant (sodium metabisulfite) over a 3 hour period, followed by a 45-minute hold. The second oxidant and reductant charges where then fed in one portion, after which the batch was held at reaction temperature of ~50° C. for 2 hours.

Comparative Examples 7-10

Comparative Examples 7-10 were prepared as described in Example 1 except 10, 50, 250, and 2,000 ppm mole/mole N,N-methylenebisacrylamide (MBA), relative to the total monomer charge, was added to the aqueous phase, respectively. The MBA is a crosslinking agent and produces products which are not encompassed by this invention.

Examples 11-12

Examples 11-12 were prepared as described in Example 1 except the mole ratio of acrylic acid to acrylamide were adjusted to 60:40 and 40:60, respectively.

Examples 13

Example 13 was prepared as described in Example 1 except the initial reaction temperature was 57° C. for 8 hours, during which the first two initiator additions were charged at 0 and 360 minutes into the hold period. The temperature was then adjusted to 65° C. and held for 2.5 hours. The third and fourth initiator additions were charged shotwise at 0 and 30 minutes into this second hold period. Aqueous sodium hydroxide was also substituted for the ammonium hydroxide on an equal molar basis.

Rheological Properties of Water Soluble Anionic Copolymers and Comparative Copolymers Table 2 is a summary of rheological characterizations of the water-soluble anionic copolymer examples relative to a benchmark commercial retention and drainage additive, Polyflex CP.3 (Ciba—Tarrytown, N.Y.). Characterization of four conventional anionic polyacrylamides (APAM) (Chemtall—Riceboro, Ga.) are also provided for comparison: EM 635, AN 956 VLM, AN 956, and AN 956 VHM. The "EM" prefix designates an inverse emulsion product while the "AN" prefix designates a dry powder product. These comparative APAM products all reportedly comprise a 50:50 molar % ratio of sodium acrylate and acrylamide. The relative molecular weight of the "AN" series increase as follows: AN 956 VLM<AN 956<AN 956 VHM.

TABLE 1

Preparation Conditions

| | Composition | | | Surfactant Package | | | | Amount | |
|---|---|---|---|---|---|---|---|---|---|
| Ex. | Acrylic Acid | Acrylamide | Aqueous Phase pH | wt. % Total | Surfactants | Ratio | Initiator | ppm relative to total monomer | Notes |
| 1 | 50.0% | 50.0% | 5.4 | 3.0% | G-946:B246SF | 1:2 | AIBN | 250/100 | |
| 2 | " | " | 3.0 | " | " | " | " | " | |
| 3 | " | " | 4.0 | " | " | " | " | " | |
| 4 | " | " | 6.0 | " | " | " | " | " | |
| Comp Ex 1 | " | " | 7.1 | " | " | " | " | " | |
| Comp Ex 2 | " | " | 8.0 | " | " | " | " | " | |
| 5 | " | " | 5.4 | " | " | 2:1 | " | " | |
| 6 | " | " | " | " | " | 1:1 | " | " | |
| 7 | " | " | " | " | Sesquioleate: | 1:2 | " | " | |
| 8 | " | " | " | " | G-946:B206 | " | " | " | |
| 9 | " | " | " | " | G-946:IL-2595 | " | " | " | |
| Comp Ex 3 | " | " | " | " | POEHEX:Sesquioleate | 85:15 | " | " | |
| Comp Ex 4 | " | " | 7.0 | " | G-946 | 100 | " | " | |
| 10 | " | " | 5.4 | " | G-946:B246SF | 1:2 | t-BHP SMBS | 25 25 | |
| Comp Ex 5 | " | " | " | " | " | " | CHP SMBS | 25/25 50/50 | |
| Comp Ex 6 | " | " | " | " | " | " | KBrO3 SMBS | 25/25 50/50 | |
| Comp Ex 7 | " | " | " | " | " | " | AIBN | 250/100 | 10 ppm MBA |
| Comp Ex 8 | " | " | " | " | " | " | " | " | 50 ppm MBA |
| Comp Ex 9 | " | " | " | " | " | " | " | " | 250 ppm MBA |
| Comp Ex 10 | " | " | " | " | " | " | " | " | 2,000 ppm MBA |
| 11 | 60.0% | 40.0% | " | " | " | " | " | " | |
| 12 | 40.0% | 60.0% | " | " | " | " | " | " | |
| 13 | 50.0% | 50.0% | " | " | " | " | " | 10/10/25/ 100 | 4 Charges Total |

Initiator amount is the molar ppm relative to the total monomer charge.
Composition is molar % ratio of monomers.
Atlas G-946 = Sorbitan Monooleate (Uniqema - New Castle, DE)
B246SF = Hypermer ® B246SF (Uniqema - New Castle, DE) (triblock polymer based on polyester derivative of hydroxystearic acid and 1500 MW poly[ethylene glycol])
Sesquioleate = Sorbitan Sesquioleate (Aldrich - Milwaukee, WI)
B206 = Hypermer ® B206 (Uniqema - New Castle, DE) (triblock polymer based on polyester derivative of hydroxystearic acid and 600 MW poly[ethylene glycol])
IL-2595 = Hypermer ® IL-2595 (Uniqema - New Castle, DE) (triblock polymer based on polyester derivative of hydroxystearic acid and 1,000 MW poly[ethylene glycol])
POEHEX = Poly(oxyethylene) sorbitol hexaoleate (HLB 10.2, Aldrich)
AIBN = 2,2'-Azobisisobutyronitrile (Wako - Richmond, VA)
t-BHP = t-Butylhydroperoxide (Aldrich - Milwaukee, WI)
SMBS = Sodium Metabisulfite (Aldrich - Milwaukee, WI)
CHP = Cumene Hydroperoxide (Aldrich - Milwaukee, WI)
KBrO3 = Potassium Bromate (Aldrich - Milwaukee, WI)
ppm MBA = Molar ppm of N,N-methylenebisacrylamide (Aldrich - Milwaukee, WI) charged relative to the total monomer charge.

Prior to inverting the water-soluble anionic copolymer emulsions for analysis ~2 wt. % of a breaker surfactant, for example a 80:20 by weight mixture of Tergitol 15-S-9 (Dow—Midland, Mich.) and Aerosol-OT-S (Cytec Industries—West Patterson, N.J.), was added. The pH of the inverted water-soluble anionic copolymers were then adjusted to a minimum of 7.0 with aqueous sodium hydroxide or ammonium hydroxide, as required.

A discussion of these rheological techniques is provided by Macosko, *Rheology: Principles, Measurements, and Applications* (New York, Wiley, 1994); L. H. Sperling, *Introduction to Polymer Science* (New York, Wiley-Interscience, 1992); and J. Ferry, *Viscoelastic Properties of Polymers*, $3^{rd}$ edition, (New York, J. Wiley & Sons, 1980). The viscoelastic behavior as discussed herein is a time dependent response to an applied force, where at short times or high frequency the material will exhibit hard or glassy properties, and at long times or low frequency a material can flow and exhibit viscous properties. Viscoelastic properties were determined with polymer solutions at 1.5% (w/w) in deionized water, utilizing a Haake RS-75 controlled stress rheometer. A frequency sweep was conducted with the rheometer in dynamic oscillation mode, at a constant stress determined to be within the linear viscoelastic region, and a frequency range of 0.01 Hz to 10 Hz. The output from this test will define both an elastic component of the material, or the energy stored per oscillatory cycle, and a viscous component, or the energy lost per cycle. The storage modulus (G') is defined as:

$$G'(Pa) = (\tau_0/\gamma_0)\cos\delta$$

and the loss modulus (G'') is defined as:

$$G''(Pa) = (\tau_0/\gamma_0)\sin\delta$$

where $\tau_0$ is the stress amplitude, $\gamma_0$ is the maximum strain amplitude, and $\delta$ is the phase angle shift between the stress and resultant strain.

In the terminal (low frequency) regime, the loss modulus is greater than the storage modulus for linear polymers, as the long times allow the polymer chains to disentangle and exhibit predominantly viscous behavior. As the frequency increases, a rubbery plateau regime occurs where the time required for the polymer chains to disentangle is greater than the time of the test. In this region, the storage modulus is greater than the loss modulus, and the material will appear to be a network comprised of permanent entanglements. The storage modulus is independent of the test frequency in this regime. The modulus is a function of network junction concentration as defined by the theory of rubber elasticity:

$$G_N = nRT$$

where $G_N$ is the plateau modulus, n is the concentration of network junctions, R is the gas constant, and T is temperature.

The plateau modulus $G_N$ can be considered to be similar in magnitude to the storage modulus G' in the plateau regime. As the concentration of network junctions increases, the modulus will increase. These network junctions can be affected by either chemical or physical cross-links. As demonstrated in Table 2, the storage modulus G' of the inventive material at 4.6 Hz is higher than an equivalent linear APAM flocculant EM 635, indicating the presence of associative network junctions.

The dilute solution properties provide a relative indication of polymer hydrodynamic volume (HDV) and molecular weight. In this experiment, the solvent viscosity ($\eta_0$) is compared to the polymer solution viscosity ($\eta$). The specific viscosity ($\eta_{sp}$) is the unitless ratio as described by the following equation.

$$\eta_{sp} = (\eta/\eta_0) - 1$$

The reduced specific viscosity (RSV) is the specific viscosity divided by the concentration. The intrinsic viscosity [$\eta$], or IV, is the specific viscosity divided by the polymer concentration (c) as the concentration is extrapolated to zero concentration:

$$[\eta] = [\eta_{sp}/c]_{c \to 0}$$

The units for IV are deciliter per gram (dL/g) and describe the hydrodynamic volume of a polymer in solution. Thus a higher IV indicates a large hydrodynamic volume in solution, and a higher MW when comparing conventional polymers of similar composition in a similar solvent. The IV values described in Table 2 were determined in 0.01 M NaCl with dilution concentrations from 0.0025% to 0.025% utilizing a Ubbelohde model "0C" Viscometer at 30° C.

The unitless Huggins' constant (k') is determined from the slope of the IV data according to:

$$\eta_{sp}/c = [\eta] + k'[\eta]^2 c$$

where the value of c is between 0.0025 and wt % and 0.025 wt %.

As reviewed by Mark et al., editors, *Encyclopedia of Polymer Science and Engineering* (New York, J. Wiley & Sons, 1988), Vol. 1, pp. 26-27, typical k' values for linear polymers are on the order of approximately 0.25-0.50. An increase in the k' value is indicative of an increase in "structure" of the polymer, and can be attributed to a number of factors including association or a cross-linked polymer structure. The k' values in Table 2 for the linear APAM are all 0.3 to 0.4, while values of greater than 0.75 are obtained for the preferred water-soluble anionic copolymer of the present invention, further supporting the presence of a non-linear species.

The viscosity average molecular weight Mv is determined from the Reduced Specific Viscosity values at 0.025% polymer in 1 M NaCl, which also contains 0.1% Surfonic® N-95 surfactant (ChevronTexaco, San Francisco). The Mv is determined from a Reduced Specific Viscosity/Mv calibration curve established for conventional APAMs of known molecular weight. The Mv in the table should be interpreted as the Mv of a linear APAM with the same Reduced Specific Viscosity as the polymer sample. Actual Mv values are likely higher than listed as associations are not disrupted at 0.1% Sulfonic N-95 surfactant.

TABLE 2

| Ex. | G' at 4.6 Hz Pa | Intrinsic Viscosity dL/g | Huggins' Constant k' | Mv g/mole |
|---|---|---|---|---|
| 1 | 260 | 41 | 2.2 | 8.0 |
| 2 | 237 | 32 | 2.0 | 3.1 |
| 3 | 236 | 32 | 2.5 | 3.0 |
| 4 | 205 | 43 | 1.9 | 7.6 |
| Comp Ex 1 | 115 | 68 | 0.7 | 13.5 |
| Comp Ex 2 | 36 | 47 | 1.5 | 4.2 |
| 5 | 312 | 29 | 2.2 | 6.2 |
| 6 | 369 | 37 | 2.3 | 4.6 |
| 7 | 310 | 38 | 1.8 | 5.6 |
| 8 | 315 | 30 | 1.7 | 3.3 |
| 9 | 290 | 39 | 2.2 | 6.6 |
| Comp Ex 3 | 130 | 82 | 0.6 | 16.7 |
| Comp Ex 4 | 136 | 88 | 0.2 | 20.7 |
| 10 | 189 | 50 | 1.1 | 12.9 |
| Comp Ex 5 | 133 | 50 | 1.0 | 8.0 |
| Comp Ex 6 | 154 | 50 | 1.0 | 9.8 |
| Comp Ex 7 | 745 | 15 | 12.0 | 1.5 |
| Comp Ex 8 | 1,869 | 10 | 3.3 | 0.6 |
| Comp Ex 9 | 4,230 | 2 | 28.0 | 0.2 |
| Comp Ex 10 | 6,539 | 1 | N/A | N/A |
| 11 | 328 | 42 | 2.3 | 6.6 |
| 12 | 237 | 41 | 1.1 | 7.6 |
| 13 | 198 | 46 | 1.9 | 5.6 |
| Polyflex CP.3 | 383 | 32 | 1.0 | N/A |
| AN 956 VLM | 31 | 20 | 0.3 | 3.8 |

TABLE 2-continued

| Ex. | G' at 4.6 Hz Pa | Intrinsic Viscosity dL/g | Huggins' Constant k' | Mv g/mole |
|---|---|---|---|---|
| AN 956 | 75 | 60 | 0.4 | 12.0 |
| AN 956 VHM | 87 | 80 | 0.4 | 17.0 |
| EM 635 | 130 | 90 | 0.3 | 23.0 |

G' Storage Modulus (Pa) = 1.5% (w/w) polymer at 4.6 Hz at 25° C.
Intrinsic Viscosity IV (dL/g): 0.01 M NaCl at utilizing a Ubbelohde Model "0C" Viscometer at 30° C.
k' = Huggins' constant measured determined from IV data.
Mv = Viscosity Average Molecular Weight determined from reduced specific viscosity/Mv calibration for known MW linear APAM.

For Examples 17-20 the calculated k' for these samples is suspect due to the low IV resulting from the presence of the cross-linker.

Performance Tests

The technique of paper sheet formation and retention chemistry is well known in the art. For example see *Handbook for Pulp and Paper Technologist*, ed. G. A. Smook, (Atlanta Ga., TAPPI Press, 1989), and PULP AND PAPER, *Chemistry and Chemical Technology*, $3^{rd}$ edition, ed. J. P. Casey, (New York, Wiley-Interscience, 1981).

To evaluate the performance of the water-soluble anionic copolymer examples of the present invention a series of Britt jar retention tests and Canadian Standard Freeness (CSF) drainage tests were conducted compared to Polyflex CP.3 (Ciba), an organic drainage aid commonly referred to within the industry as a "micropolymer". Four conventional anionic polyacrylamides (Chemtall) were also evaluated for comparison: EM 635, AN 956 VLM, AN 956, and AN 956 VHM. Unless otherwise stated, all percentages, parts, etc., are by weight.

For each of these examples copolymers were mixed with a benchmark cationic polyacrylamide and tested. In a similar manner, the example copolymers were mixed with a benchmark anionic polyacrylamide/sodium acrylate. The example copolymers were added at 0.4 lbs of active component/ton of furnish solids. Thus, the efficacy of the invention copolymers and comparative copolymers were compared to these cationic and anionic retention/drainage formulations without the added invention copolymers. The following is a description of the test procedures.

The furnish employed in this series of tests is a synthetic alkaline furnish. This furnish is prepared from hardwood and softwood dried market lap pulps, and from water and further materials. First the hardwood and softwood dried market lap pulp are separately refined in a laboratory Valley Beater (Voith, Appleton, Wis.). These pulps are then added to an aqueous medium.

The aqueous medium utilized in preparing the furnish comprises a mixture of local hard water and deionized water to a representative hardness. Inorganic salts are added in amounts so as to provide this medium with a representative alkalinity and a total solution conductivity.

To prepare the furnish, the hardwood and softwood are dispersed into the aqueous medium at typical weight ratios of hardwood and softwood. Precipitated calcium carbonate (PCC) is introduced into the furnish at 25 weight percent, based on the combined dry weight of the pulps, so as to provide a final furnish comprising 80% fiber and 20% PCC filler.

The cationic potato starch utilized is Stalok 400 (A. E. Staley, Decatur, Ill.), and the alum is aluminum sulfate-octadecahydrate available as a 50% solution (Delta Chemical Corporation, Baltimore, Md.).

The cationic flocculant utilized in the benchmark cationic polyacrylamide treatment program (referred to as CPAM) is a 90/10 mole % acrylamide/acryloxytrimethylammonium chloride (Perform PC 8138, Hercules). The anionic flocculent utilized in the benchmark anionic polyacrylamide program (referred to as APAM) is a 70/30 mole % acrylamide/ sodium acrylate copolymer (Perform PA 8137, Hercules); the flocculants are commercially available as self-inverting water-in-oil emulsions. The water-soluble anionic copolymers and Comparative Copolymers were added at 0.4 lbs/ton to a baseline treatment formulation for the "0.4# CPAM" data consisted of 10 lb./ton Sta-Lok 400, 5 lb./ton alum, and 0.4 lb./ton Perform PC 8138. The baseline treatment for the "0.2# APAM" data consisted of 10 lb./ton Sta-Lok 400, 5 lb./ton alum, and 0.2 lb./ton Perform PA 8137.

The Britt jar retention test (Paper Research Materials, Inc., Gig Harbor, Wash.) is known in the art. In the Britt jar retention test a specific volume of furnish is mixed under dynamic conditions and an aliquot of the furnish is drained through the bottom screen of the jar, so that the level of fine materials which are retained can be quantified. The Britt jar utilized for the present tests is equipped with 3 vanes on the cylinder walls to induce turbulent mix, and a 76 μm screen in the bottom plate.

The Britt jar retention tests are conducted with ~500 ml of the synthetic furnish, having a total solids concentration of 0.5%. The test is conducted at 1,200 rpm with the sequential addition of starch, followed by alum, followed by polymer flocculant, followed by drainage aid; the materials are all mixed for specified interval times. After the drainage aid has been introduced and mixed, the filtrate is collected.

The retention values calculated are fines retention where the total fines content in the furnish is first determined by washing ~500 ml of furnish with 10 liters of water under mixing conditions to remove all the fine particles, defined as particles smaller than the Britt jar 76 μm screen. The fines retention for each treatment is then determined by draining 100 ml of filtrate after the described addition sequence, then filtering the filtrate through a pre-weighed 1.5 μm filter paper. The fines retention are calculated according to the following equation:

% Fines retention=(filtrate wt.−fines wt.)/filtrate wt.

wherein the filtrate and fines weight are both normalized to 100 ml. The retention values obtained represent the average of 2 replicate runs.

The Britt jar retention test was run with the water-soluble anionic copolymer examples and the Comparative examples at 0.4 lb/ton of pulp and with CPAM at 0.4 lb/ton of pulp.

The CSF device (Lorentzen & Wettre, Code 30, Stockholm, Sweden) is utilized to determine relative drainage rate or dewatering rate also is known in the art (TAPPI Test Procedure T-227). The CSF device consists of a drainage chamber and a rate measuring funnel, both mounted on a suitable support. The drainage chamber is cylindrical, fitted with a perforated screen plate and a hinged plate on the bottom, and with a vacuum tight hinged lid on the top. The rate-measuring funnel is equipped with a bottom orifice and a side, overflow orifice.

The CSF drainage tests are conducted with 1 liter of the furnish at a solids 0.30% consistency. The furnish is prepared for the described treatment externally from the CSF device, utilizing equivalent speeds and mixing times as described for the Britt jar tests, in a square beaker to provide turbulent mixing. Upon completion of the addition of the additives and the mixing sequence, the treated furnish is poured into in the drainage chamber, closing the top lid, and then immediately opening the bottom plate. The water is allowed to drain freely into the rate-measuring funnel; water flow that exceeds that determined by the bottom orifice will overflow through the side orifice and is collected in a graduated cylinder. The values generated are described in milliliters (ml) of filtrate; higher quantitative values represent higher levels of drainage or dewatering.

The Britt jar retention and CSF values reported in Table 3 are the difference in the retention and freeness values for the example compounds relative to a CPAM or APAM base treatment. In both the Britt jar retention and CSF drainage tests, higher improvement values indicate higher activity and a more desired response.

TABLE 3

| Ex. | 0.4# CPAM Britt Jar % Fines retention | 0.4# CPAM CSF ml Increase | 0.2# APAM CSF ml Increase |
|---|---|---|---|
| 1 | 30.0 | 200 | 155 |
| 2 | 28.0 | 190 | 150 |
| 3 | 27.5 | 180 | 140 |
| 4 | 31.5 | 205 | 160 |
| Comp Ex 1 | 23.9 | 165 | 120 |
| Comp Ex 2 | 5.6 | 145 | 105 |
| 5 | 27.0 | 180 | 135 |
| 6 | 30.0 | 200 | 150 |
| 7 | 31.5 | 210 | 160 |
| 8 | 19.7 | 120 | 95 |
| 9 | 30.0 | 175 | 135 |
| Comp Ex 3 | 28.0 | 200 | 165 |
| Comp Ex 4 | 27.0 | 205 | 165 |
| 10 | 27.3 | 195 | 155 |
| Comp Ex 5 | 25.9 | 200 | 150 |
| Comp Ex 6 | 27.9 | 200 | 150 |
| Comp Ex 7 | 20.1 | 160 | 130 |
| Comp Ex 8 | 22.3 | 140 | 100 |
| Comp Ex 9 | 8.4 | 95 | 60 |
| Comp Ex 10 | −20.0 | 60 | −10 |
| 11 | 29.5 | 200 | 150 |
| 12 | 32.9 | 200 | 155 |
| 13 | 30.0 | 205 | 155 |
| Polyflex CP.3 | 30.0 | 200 | 150 |
| AN 956 VLM | 0.0 | 120 | 70 |
| AN 956 | 15.0 | 160 | 120 |
| AN 956 VHM | 18.0 | 185 | 130 |
| EM 635 | 20.0 | 190 | 135 |

The data set forth in Table 3 illustrate the retention/drainage activity (R/D) of the water-soluble anionic copolymers of the invention compared to the results obtained with Polyflex CP.3, conventional anionic polyacrylamides and comparative examples. In general, for the G-946/B246SF surfactant plus AIBN initiator system, the overall R/D activity was optimum for an aqueous phase pH of the 5-6 (Examples 1, 4, 5, and 6) and increasing B246SF content in the surfactant package (Examples 1, 5 and 6). For the other initiator and/or surfactant systems the R/D activity was comparable to Polyflex CP.3 and the conventional anionic polyacrylamides, except for Example 8 which exhibited an increased, but overall lower, R/D activity.

A series of retention and drainage tests were also conducted utilizing a vacuum drainage test (VDT) developed to differentiate the activity between the microparticle technology and conventional linear flocculants. The results of this testing demonstrate the ability of the VDT to differentiate drainage aids in both CPAM and APAM programs by the magnitude of the drainage time.

The device setup is similar to the Buchner funnel test as described in various filtration reference books, for example see *Perry's Chemical Engineers' Handbook*, 7$^{th}$ edition, (McGraw-Hill, N.Y., 1999) pp.18-78. The VDT consists of a 300-ml magnetic Gelman filter funnel, a 250-ml graduated cylinder, a quick disconnect, a water trap, and a vacuum pump with a vacuum gauge and regulator. The VDT test is conducted by first setting the vacuum to the desired level, typically 10 inches Hg, and placing the funnel properly on the cylinder. Next, 250 g of 0.5 wt. % paper stock is charged into a beaker and then the required additives according to treatment program (e.g., starch, alum, and testing flocculants) are added to the stock under the agitation provided by an overhead mixer. The stock is then poured into the filter funnel and the vacuum pump is turned on while simultaneously starting a stopwatch. The drainage efficacy is reported as the time required to obtain 230 ml of filtrate.

The principle of the VDT is based on the cake filtration theory, for reference see L. Svarovsky, editor, *Solid-Liquid Separation*, 3$^{rd}$ edition (London, Butterworths, 1990), Chapter 9. Initially, the solids in the slurry are deposited on a relative thin filter medium that serves to support the filter cake. The successive deposits of solids layer to form the filter cake, or mat. The rate of filtrate passing through the filter cake (or mat) is dependent on floc density, floc size distribution in the mat, and levels of residual polymeric materials in the aqueous phase. A flocculant that forms dense and uniform-sized flocs and has low residual level in water (i.e., good formation characteristics) will demonstrate good drainage in the VDT test, and vice versa.

The data set forth in Table 4 illustrates the activity of the water-soluble anionic copolymers of the invention for a series of VDT evaluations in an APAM program identical to the formulation used in the CSF tests. The associated starch, alum, and anionic flocculant levels of the base treatment are as described for Table 3. The experimental and comparison examples were evaluated at 0.4 lb./ton as actives. A difference in drainage time of greater than 1.0 second is considered statistically significant between samples.

TABLE 4

| Ex. | 0.4 lb./ton VDT (sec) |
|---|---|
| 1 | 21.3 |
| 2 | 22.1 |
| 3 | 22.5 |
| 4 | 21.2 |
| Comp Ex 1 | 23.7 |
| Comp Ex 2 | 27.0 |
| 5 | 22.0 |
| 6 | 20.6 |
| 7 | 20.5 |
| 8 | 24.9 |
| 9 | 27.5 |
| Comp Ex 3 | 22.4 |
| Comp Ex 4 | 23.6 |
| 10 | 21.9 |
| Comp Ex 5 | 23.6 |
| Comp Ex 6 | 22.2 |
| Comp Ex 7 | 23.0 |
| Comp Ex 8 | 24.2 |
| Comp Ex 9 | 27.0 |
| Comp Ex 10 | 33.0 |
| 11 | 21.0 |
| 12 | 20.3 |
| 13 | 20.6 |

TABLE 4-continued

| Ex. | 0.4 lb./ton VDT (sec) |
|---|---|
| Polyflex CP.3 | 20.0 |
| AN 956 VLM | 28.6 |
| AN 956 | 25.0 |
| AN 956 VHM | 26.2 |
| EM 635 | 25.6 |
| Control Test No Drainage Control Agent | 32.0 |

The data in Table 4 demonstrate a difference in the magnitude of drainage time for the water-soluble anionic copolymers of the present invention, Polyflex CP.3, and conventional anionic polyacrylamide flocculants. The Polyflex CP.3 demonstrates a fast drainage rate, whereas the conventional anionic polyacrylamide flocculants were characterized by a slower drainage rate. In general, for the water-soluble anionic copolymers prepared utilizing the G-946/B246SF surfactant combination plus AIBN initiator combination, the performance trends were comparable to Polyflex CP.3 for the examples exhibiting optimized R/D activity in Table 3. The VDT response for the Comparative Examples was observed to decrease dramatically on increasing the aqueous phase pH greater than 6, and with increasing addition of MBA. The Comparative Examples of polymers prepared with alternative surfactant systems (Comparative Examples 3 and 4) and initiator systems (Comparative Examples 5 and 6) exhibit poor VDT drainage response, similar to that of the conventional anionic polyacrylamides.

Overall, utilization of certain combinations of emulsification surfactants, initiator systems, and aqueous phase pH yield water-soluble anionic copolymers characterized by a k' greater than 0.75, and a G' greater than 175 Pa, that unexpectedly exhibit R/D and formation activity comparable with that of the Polyflex CP.3 organic microparticle technology.

Preferred water-soluble anionic copolymers of the present invention are prepared via an inverse emulsion polymerization technique employing an emulsification surfactant consisting of an A-B or A-B-A polymeric surfactant, an aqueous phase pH of 2 to 7, and an oil-soluble free radical initiator.

Particularly preferred water-soluble anionic copolymers are prepared via an inverse emulsion polymerization technique employing Hypermer® B246SF or IL-2595 with sorbitan monooleate as the emulsification surfactant package, an aqueous phase pH of 3 to 6, and employing 2,2'-azobisisobutyronitrile (AIBN) as the free radical initiator.

It is noted that the foregoing examples have been provided merely for the purpose of explanation and are in no way to be construed as limiting of the present invention. While the present invention has been described with reference to an exemplary embodiment, it is understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein. For example, cationic and/or amphoteric copolymers prepared per the preferred polymerization conditions may also exhibit unique activity in papermaking applications. The water-soluble anionic copolymers of the present invention may also exhibit unique activity in other applications such as coagulants and/or flocculants in wastewater treatment applications, or as rheology modifiers in drilling and/or cement processing applications.

What is claimed is:

1. A method of preparing a polymer by water-in-oil emulsion polymerization comprising:
   (a) preparing an oil phase comprising: at least one hydrocarbon; and a surfactant system wherein the surfactant system comprises at least one diblock or triblock surfactant to form an emulsion upon the addition of an aqueous phase;
   (b) preparing an aqueous phase comprising at least one ethylenically unsaturated anionic monomer and at least one ethylenically unsaturated anionic monomer and at least one ethylenically unsaturated nonionic monomer;
   (c) adding said aqueous phase (b) to said oil phase (c) to form an emulsion; and
   (d) causing the monomers in the emulsion to polymerize by free radical polymerization;
   wherein the diblock or triblock surfactant to monomer ratio is at least about 0.03 and the pH is adjusted to from about 2 to about 7 and wherein no additional crossing linking agent is added to the system, wherein the resulting polymer having a Huggins' constant (k') determined between 0.0025 wt. % to 0.025 wt. % of said polymer in 0.01 m NaCl is greater than 0.75; and having a storage modulus (G') for a 1.5 wt. % actives of said polymer solution at 4.6 Hz is greater tan 175 Pa.

2. The method of claim 1 wherein the surfactant system has a combined Hydrophilic-Lipophilic Balance of less than 8.

3. The method of claim 1 wherein the pH is from about 3 to about 6.

4. The method of claim 1 wherein the diblock or triblock surfactant is a copolymer based on polyester derivatives of fatty acids and poly[ethyleneoxide].

5. The method of claim 1 wherein the ethylenically unsaturated nonionic monomer is selected from the group consisting of acrylamide, methacrylamide; N-alkylacrylamides, N,N-dialkyl-acrylamide; methyl formamide; vinyl acetate; N-vinyl pyrrolidone; and mixtures of any of the foregoing.

6. The method of claim 1 wherein the ethylenically unsaturated anionic monomer is selected from the group consisting of the free acids and salts of acrylic acid; methacrylic acid; maleic acid; itaconic acid; acrylamideoglycolic acid; 2-acrylamido-2-methyl-1propanesulfonic acid; 3-allyloxy-2-hydroxy-1-propanesulfonic acid; styrenesulfonic acid; vinylsulfonic acid; vinylphosphonic acid; 2-acrylamido-2-methylpropane phosphonic acid; and mixtures of any of the foregoing.

7. The method of claim 1 wherein the method further comprises adding a free radical initiator.

8. The method of claim 7 wherein the free radical initiator is 2,2'-azobisisobutyronitrile.

9. The method of claim 7 wherein the free radical initiator is lauryl peroxide.

10. The method of claim 7 wherein the free radical initiator is selected from the group consisting of 2,2'-azobis-(2,4-dimethylpentanonitrile), 2,2'-azobis-(2,-methylbutanonitrile, 1,1'-azobis-(cyclohexanecarbonitrile), benzoylperoxide and mixtures of any of the foregoing.

11. The method of claim 1 wherein the diblock or triblock surfactant to monomer ratio is at least about 4:100.

12. The method of claim 1 wherein the nonionic polymer segment B is acrylamide and the anionic polymer segment F is selected from the group consisting of the sodium, potassium or ammonium salt of acrylic acid.

13. The method of claim 1 wherein the surfactant system comprises a) a diblock or triblock surfactant derived from the oil-soluble complex monocarboxylic acid and a water soluble component derived from polyalkylene glycol, and b) a sorbitan fatty acid ester; the pH of the aqueous phase is 3 to 6; and 2,2'-azobisisobutyronitrile is employed as the free radical initiator.

14. The method of claim 1 wherein B is acrylamide and F is a salt of acrylic acid, the molar % ratio of acrylic acid: acrylamide is from about 75:25 to 25:75 and wherein the water in oil emulsion is prepared employing an oil soluble free radical initiator; and an emulsification surfactant package with a combined Hydrophilic-Lipophilic Balance of less than 8 consisting of diblock or triblock polymeric surfactants; and wherein the process further comprises adding a breaker surfactant to enhance the inversion of the emulsion when the polymerized solution is added to water.

15. The method of claim 14 wherein the molar ratio of acrylic acid: acrylamide is from 60:40 to 40:60.

* * * * *